United States Patent [19]

Erikson et al.

[11] Patent Number: 5,027,671
[45] Date of Patent: Jul. 2, 1991

[54] REINFORCED ANTI-BACKLASH NUT

[75] Inventors: Keith W. Erikson, Hollis; Kenneth W. Erikson, Amherst, both of N.H.

[73] Assignee: Kerk Motion Products, Inc., Hollis, N.H.

[21] Appl. No.: 539,908

[22] Filed: Jun. 18, 1990

[51] Int. Cl.5 .................. F16H 55/18; F16B 37/08
[52] U.S. Cl. ................... 74/441; 74/424.8 A; 411/270; 411/433
[58] Field of Search ............ 411/265, 266, 270, 324, 411/433; 74/409, 424.8 A, 441

[56]  References Cited

U.S. PATENT DOCUMENTS

| 747,270 | 12/1903 | Taylor | 411/433 |
| 4,210,033 | 7/1980 | Erikson et al. | 411/433 |
| 4,249,426 | 2/1981 | Erikson et al. | 411/433 |
| 4,679,457 | 7/1987 | Nishikawa et al. | 74/441 |

Primary Examiner—Neill R. Wilson
Attorney, Agent, or Firm—Hamilton, Brook, Smith & Reynolds

[57] ABSTRACT

An anti-backlash nut has flexure members which are continuously biased inwardly against a lead screw by a force applying sleeve which acts on ramps on the flexure member. The spline means include means on the longitudinal flexure members and the force applying sleeve to impart rigidity to the longitudinal flexure members in a direction tangential to the longitudinal direction of movement of the nut.

9 Claims, 4 Drawing Sheets

10

REINFORCED ANTI-BACKLASH NUT

FIELD OF THE INVENTION

This invention is in the field of anti-backlash nuts which are designed to provide uniform translational movement along a threaded lead screw, in either direction in response to relative rotational movement between the nut and screw and, more particularly, relates to the reinforcement of said nuts.

BACKGROUND OF THE INVENTION

In many applications, it is important to drive an element of a machine along a lead screw with accurate positional repeatability and constant drag torque in both forward and reverse directions. Data printers and x-y tables, used as peripheral equipment in the computer industry, for example, have such requirements.

Positioning devices designed to meet these requirements have been proposed, and many of these employ an anti-backlash nut to achieve the positional accuracy along the screw which is required. Examples of two such anti-backlash nut assemblies which have been proposed are described in the patent literature as follows.

In U.S. Pat. No. 3,656,358, issued to Kopp, a linear positioning device is disclosed which is stated to have an improved collar for use with a comparatively inexpensive rod having multiple grooves. The collar is telescoped over and adapted to be translated back and forth relative to the elongated rod. This collar includes cantilevered fingers which are resiliently wedged into angularly spaced grooves formed in the rod to preload the collar onto the rod and prevent rotational play from developing between the two. In a specific embodiment, the collar is telescoped onto a rod in the form of a splined shaft while in another embodiment, the collar is a nut threaded onto a screw with multiple threads.

In U.S. Pat. No. 3,997,269, issued to Linley, an anti-backlash, self-aligning nut construction with specially constructed tubular nut bodies which co-act with concentric spring sleeves is described. The nut bodies, in general, each have a pair of spring-biased elements provided with internal thread formations adapted for engagement with the external threads of a screw. In one embodiment, a self-aligning spring sleeve is provided having solely three pairs of oppositely-disposed transverse slots to obtain the desired aligning features. The nut body has a base portion which is separated from the spring-biased elements by means of two transverse slots which, together with an adjacent pair of slots in the spring sleeve, form in effect a universal joint. One of the remaining slot pairs in the sleeve is oriented circumferentially with respect to the first pair by an angle of 90°, with a third pair of slots being circumferentially aligned with the first pair.

More recently, an anti-backlash nut having oppositely-directly longitudinal flexure members has been disclosed in U.S. Pat. No. 4,210,033, which issued to the present inventors. This anti-backlash nut has a continuous portion extending longitudinally from one end of the screw to the other. In addition, there are at least two, and usually more, oppositely-directed longitudinal flexure members which have one end fixed to the anti-backlash nut and one end free-floating. The oppositely-directed longitudinal flexure members are biased towards the screw by one or more radial springs or other means for biasing.

Yet another anti-backlash nut is disclosed in our U.S. Pat. No. 4,249,426, reissued as RE. 32,433, dated June 9, 1987.

This patent discloses an anti-backlash nut which has one or more longitudinal flexure members with one end of each member fixed and one end free floating in cantilever fashion. The nut, including the flexure members, undergoes translational movement along a threaded shaft or lead screw. Each longitudinal flexure member has a ramp at its free-floating end. The nut is surrounded by an annular pressure applying ring which derives its force from a compression spring. The ring is constantly urged against the ramps which, in turn, creates radial force vectors to maintain the internal threads formed on the flexure members in contact with the threads of the shaft during operation and even after the nut has become worn.

The threads on the shaft are in the form of a helix, as are the mating threads on the interior of the flexure members. When a load is placed on the nut, as for example, when it is attached to a carriage or printer, there is a substantial force component acting axially of the shaft or lead screw and bearing on the threads of the flexure members. The axial force translates into two force vectors, one in the axial direction of the shaft and the other normal thereto, tangential to the shaft. This induces the cantilever mounted longitudinal flexure members to deflect in a direction normal or tangential to the axis of the shaft. This can induce unwanted backlash.

It is, therefore, an object of the present invention to provide an anti-backlash nut having longitudinal flexure members and means for providing structural rigidity to the members to counteract unwanted resultant tangential forces due to load on the nut.

SUMMARY OF THE INVENTION

The invention resides in an anti-backlash nut which moves along a lead screw in either of two longitudinal directions. The screw has an external helical thread and the nut has internal mating threads. The nut includes at least one longitudinal flexure member which has one end fixed to the nut body with the other end free floating. The longitudinal flexure member(s) have inclined ramps on their outer surfaces. The ramps extend radially outwardly in a direction away from the fixed end.

An annular member surrounding the nut body applies an external force radially inwardly to each of the ramps, the force being substantially constant in either direction of movement of the nut. The annular member is urged by a compression spring into engagement with the ramp(s). The axial force applied to the ramp urges the internal threads of the flexure members constantly into engagement with the external threads of the shaft to eliminate backlash.

To add structural rigidity to the flexure members and to counteract force acting in a direction which is tangential to the longitudinal direction of movement of the nut, cooperating spline means are provided on the longitudinal flexure members and the annular force applying member.

The spline means include a longitudinal groove in each of the flexure members extending parallel to the axis of the screw and a complementary mating longitudinal ridge projecting from the annular force supplying member engageable within the groove.

Alternatively, the spline means may include a projecting longitudinal ridge on each flexure member also extending parallel to the axis of the screw and a complementary mating longitudinal groove in the annual force applying member engageable within the groove.

In both of the embodiments, the tangential force vector applied to the longitudinal flexure members is counteracted by the annular force applying member surrounding the flexure members due to its rigidity and its resistance to tangential compression.

The above and other features of the invention, including various novel details of construction and combinations of parts will now be more particularly described with reference to the accompanying figures and pointed out in the claims. It will be understood that the particular reinforced anti-backlash nut embodying the invention is shown by way of illustration only and not as a limitation of the invention. The principals and features of this invention may be employed in varied and numerous embodiments without departing from the scope of the invention.

DETAILED DESCRIPTION OF THE INVENTION

Figure 1:
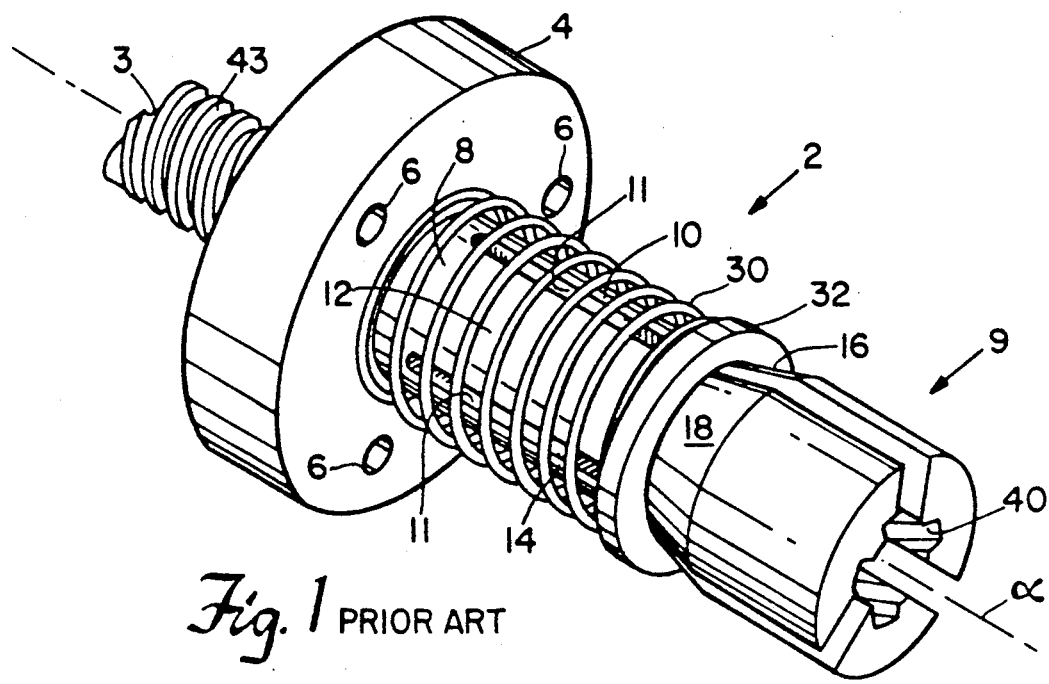
FIG. 1 is a perspective view of an anti-backlash nut representing the prior art.
Figure 2:
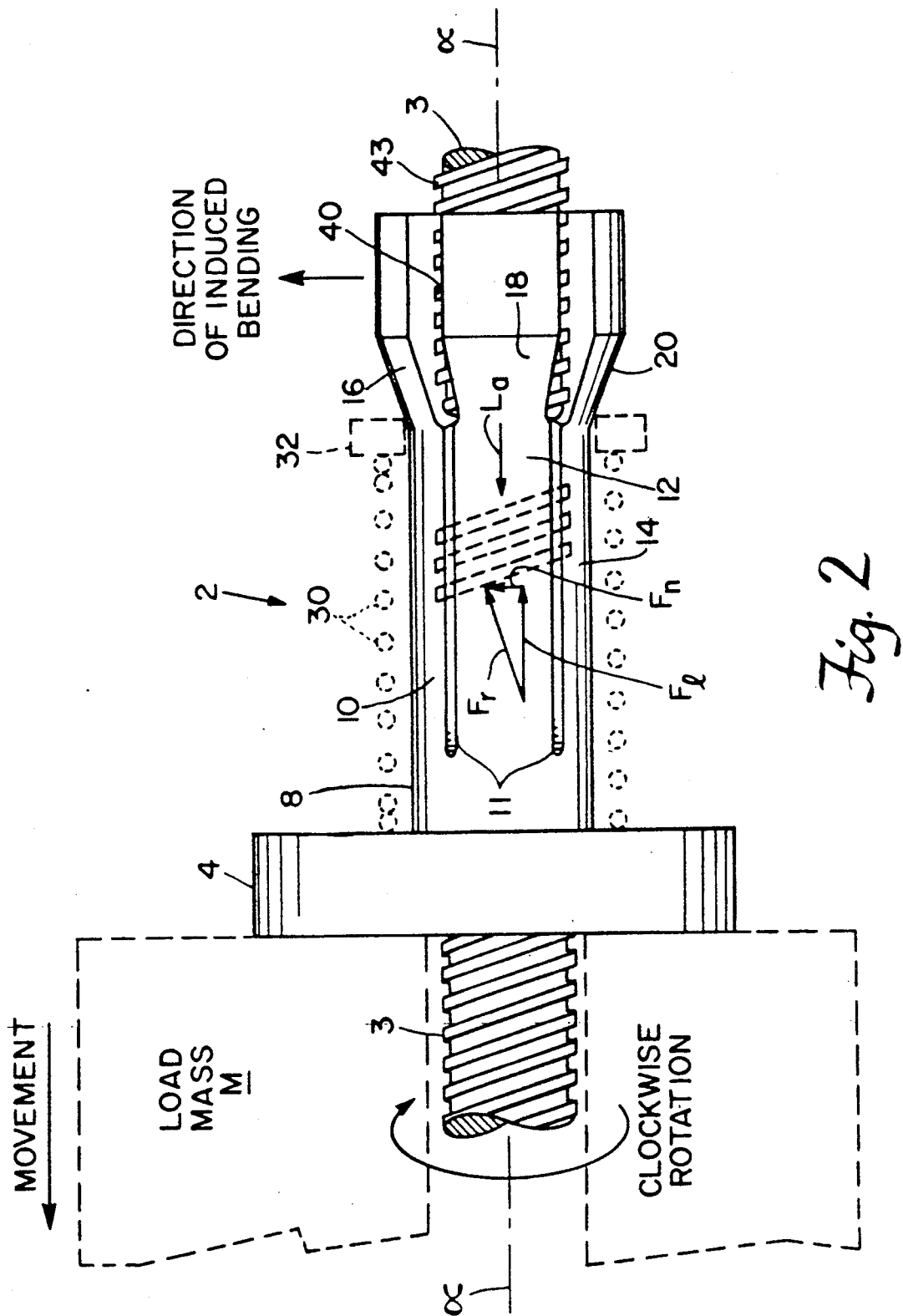
FIG. 2 is a side elevation of the prior art anti-backlash mechanism shown under load.

FIG. 1, is similar to FIG. 9 of our prior U.S. Pat. No. 4,249,426, reissued as RE. 32,433 and represents the prior art nut. FIG. 2 shows the nut in schematic form attached to a load mass M.

Referring to FIGS. 1 and 2, the nut is generally designated 2, and has a face plate 4, which contains equally spaced attachment holes 6, so that it can be attached to an element to be driven (i.e., the load), such as by bolting. The nut has a circumferentially continuous portion 8 at the face plate end and a segmented circumferential portion, generally indicated 9, at the opposite end. The nut 2 is connected by threads to a lead screw 3.

Three longitudinal flexure members 10, 12 and 14, separated from each other by gaps 11, extend outwardly from the circumferential continuous portion 8. The circumferential portion 9 at the free end of the nut is made up of three segments, one at the end of each longitudinal flexure member 10, 12 and 14 which, respectively, have ramps 16, 18 and 20, near the outside surfaces of their free floating ends. The circumferential diameter of the segmented portion 9 is greater than that of the portion 8.

An axial compression spring 30 surrounds the anti-backlash nut and is held in compression between the face plate 4 and a ring or annular force applying member 32, which is initially located at the base of the ramps 16, 18 and 20. The ring 32 will slide up the ramps 16, 18 and 20 under the axial force supplied by the spring 30. This urges the flexure members 8, 10 and 12, axially inwardly at all times toward the axis alpha of the lead screw 3 in a continuing manner to accommodate wear and, thus, eliminate backlash. As thus far described, anti-backlash nut is operationally the same as in our reissue Pat., RE. 32,433.

The anti-backlash nut is hollow and inwardly threaded, as indicated at 40 in FIGS. 1 and 2. Its threads 40 are in engagement with threads 42 on the lead screw 3. Rotation of the lead screw in either a clockwise or counter-clockwise direction causes the anti-backlash nut to translate without rotation lengthwise of the screw 3 and when the face plate 4 is attached to a load, it causes the load to reciprocate relative to the axis alpha of the screw.

Figure 3:
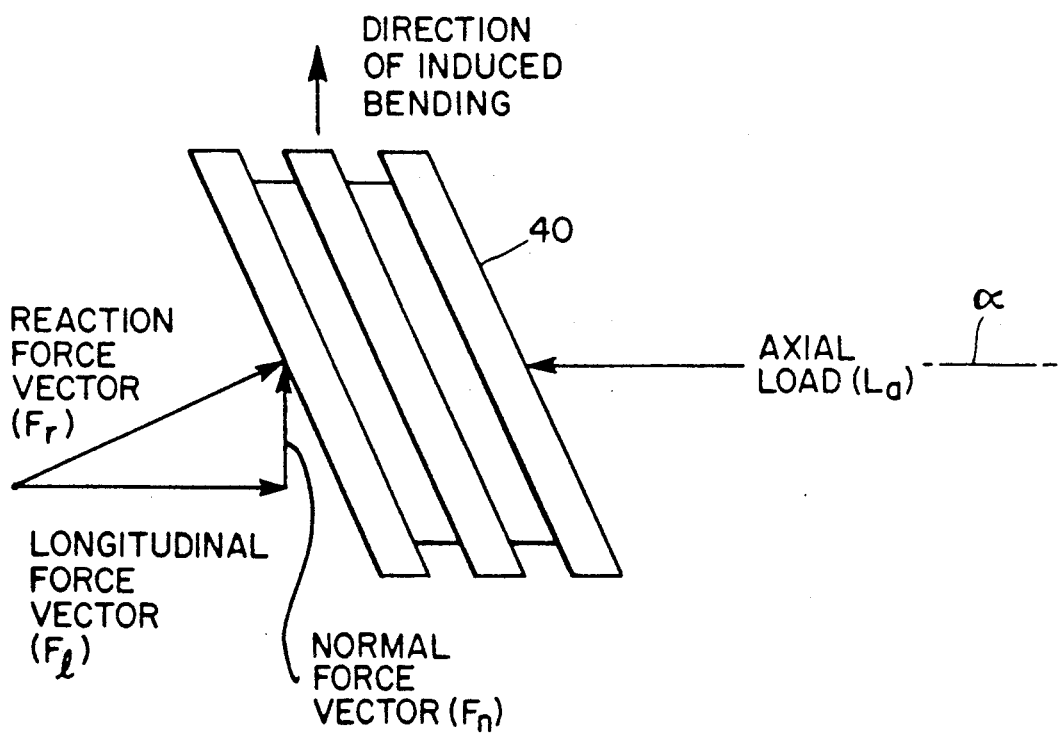
FIG. 3 is a force diagram of the prior art mechanism under load.

Referring particularly to FIGS. 2 and 3, when, for example, the lead screw 42 is rotating in a clockwise direction with a load mass M secured to the face plate 4, the nut and the mass 4 are moved from right to left, as viewed in the figures. An axial load $L_a$ is delivered to the nut by the threads 43 of the lead screw 3. Since the threads are helical about the axis alpha, they are inclined at an angle to the axial load $L_a$.

In FIG. 3, the reactive forces to the load will be seen acting on the interior threads 40 of the longitudinal flexure members 10, 12 and 14. There is a reaction force vector $F_r$ acting normal to the threads 40 on the flexure members and longitudinal force vector $F_l$ parallel to the axis alpha and a normal force vector $F_n$ acting at right angles to the axial load. The normal force vector $F_n$ causes the flexure members 10, 12 and 14 to be bent or induced away from the parallelism with the axis alpha in the direction of the arrow designated "direction of induced bending". This force is inclined to separate the threads 40 on the inner side of the flexure members 8, 10 and 12 from the threads on the lead screw 42, with a potential result of induced backlash. Thus, there is a component of force acting on the flexure members in a direction tangential or normal to the rotational axis alpha of the lead screw. This would cause the anti-backlash nut, generally made of plastic, to wear more rapidly than desired if not rectified.

The problem is overcome in the following manner: reenforcement is applied to the individual flexure members 10, 12 and 14 in the form of spline means which extend parallel to the rotational axis alpha of the lead screw, which is also the central axis of the anti-backlash nut. The spline means are spaced radially outwardly of the axis alpha.

Figure 4:
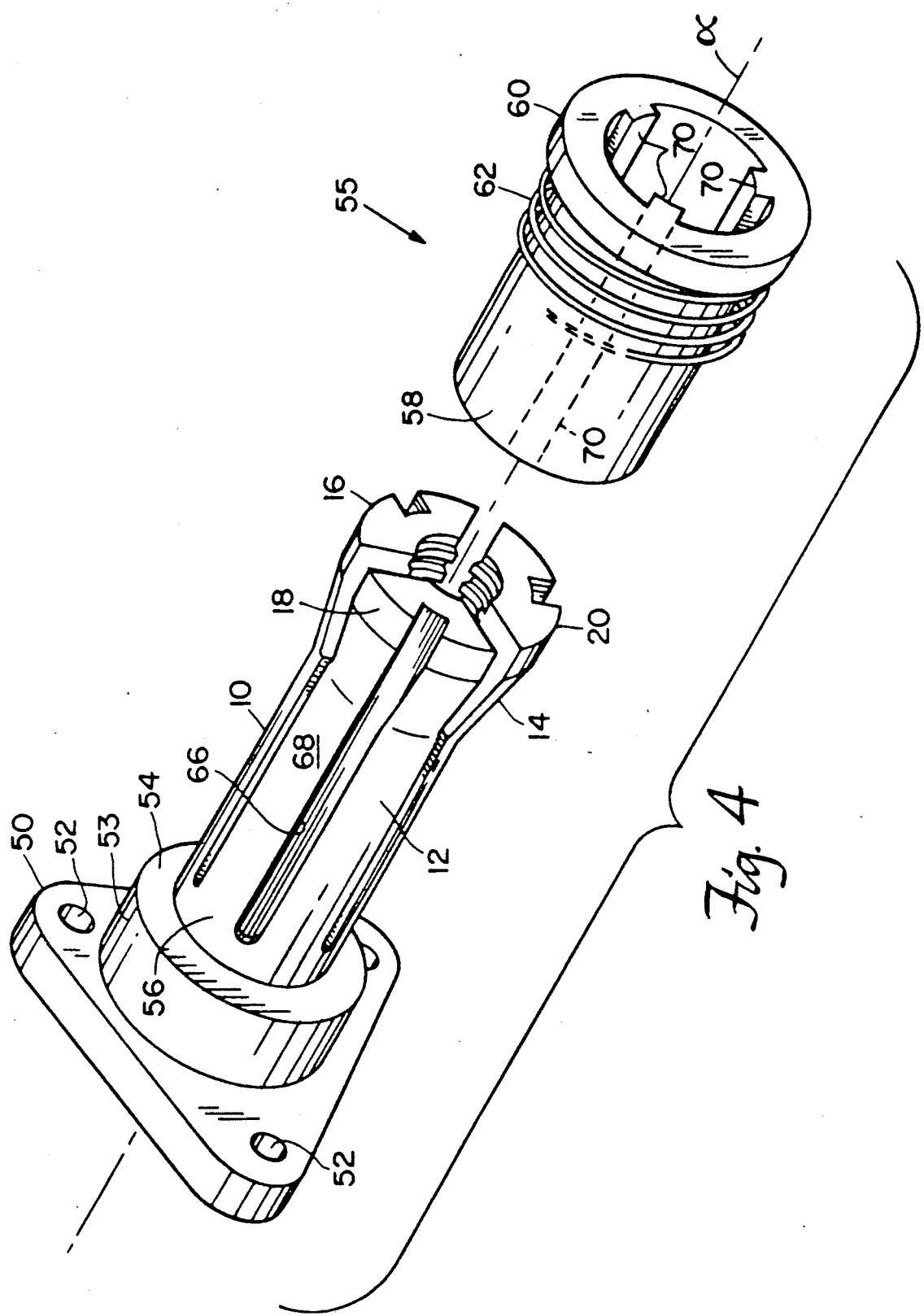
FIG. 4 is a perspective view of one embodiment of the present invention.

As will be seen in FIG. 4, an anti-backlash nut will be seen as having a face plate 50, which is substantially triangular in shape, although it may be any convenient shape as determined by the load to which it is to be attached. It includes holes 52 for securing it by bolts to the load. There is a cylindrical projection 53, having a flat face 54, which is normal to the axis alpha. Flexure members 10, 12 and 14 extend from circumferentially continuous portion 56 of the nut and include ramps 16, 18 and 20, as in the prior art.

A force applying sleeve, generally indicated 55, is hollow and has a cylindrical portion 58, and a collar 60. A compression spring 62 surrounds the cylindrical portion 58 and abuts the collar 60 and when the sleeve 55 is assembled over the flexure members 10, 12 and 14. The opposite end of the spring abuts the face 54 on the projection 53 or the face plate 50, depending on the diameter of the spring. Under the force of the compression spring 62, the face of the collar of the sleeve 55 is urged continuously against the ramps 16, 18 and 20 to cause the flexure members 10, 12 and 14 to be constantly urged inwardly toward the axis alpha to reduce backlash between the threads 40 of the anti-backlash nut and the threads 43 of the lead screw 3, which is not shown in FIGS. 4 and 5.

The spline means comprise, in part, longitudinal grooves 66 formed in the surface 68 of each of the longitudinal flexure members 10, 12 and 14 and extending parallel to the axis alpha. When the sleeve 55 is fitted over the flexure members 10, 12 and 14, mating, parallel projecting ridges 70 formed on the inside of the screw 55 are received and slide in the longitudinal grooves 66 which are located at the same angular spacing relative to the axis alpha, as are the ridges 70. Thus, as the axial load $L_a$ is applied, the resultant normal force vector $F_n$, which induces bending of the flexure members 8, 10 and 12 in a direction tangential to the axis alpha, is counteracted by the ridges 70 on the sleeve 55 preventing the flexure members from being displaced. The sleeve 55 surrounding this flexure member resists displacement to its rigidity and its resistance to tangential compression. This not only increases wear life of the product, but prevents inadvertent backlash from being created.

Figure 5:
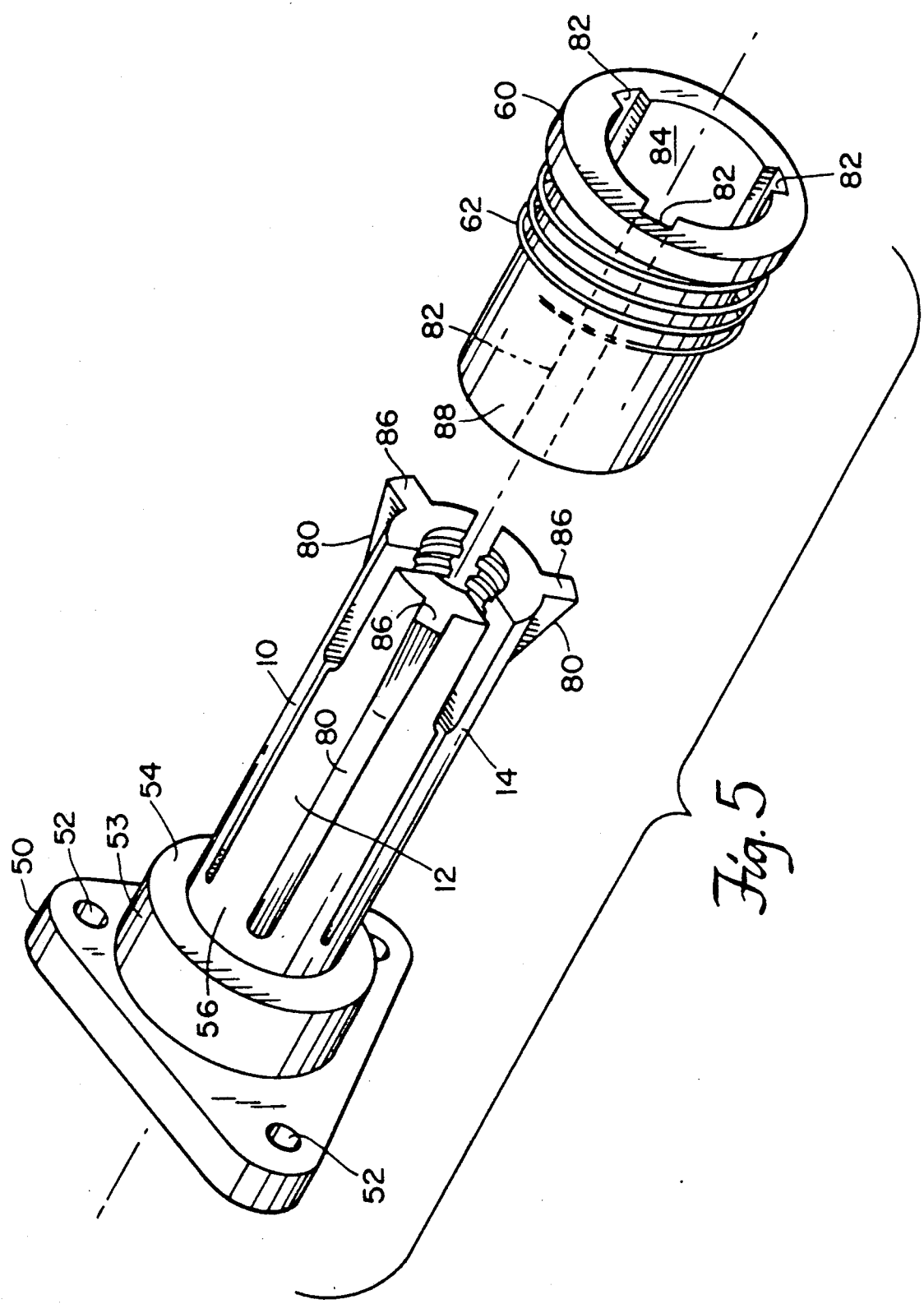
FIG. 5 is a perspective view of a second embodiment of the present invention.

Another embodiment of the invention is seen in FIG. 5, wherein the spline means include longitudinally extending parallel ridges 80 on each of the flexure members. They extend parallel to the axis alpha and are located radially outwardly thereof. There is a mating complementary longitudinal groove 82 for each of the ridges spaced around the axis alpha uniformly and projecting inwardly from the interior circular surface 84 of the force applying sleeve 55. There are ramp portions 86 on the ridges which are the equivalent of the ramps 16, 18 and 20 of the FIG. 4 embodiment. The ridges 80 engage within the grooves 82 when the sleeve 55 is assembled over the flexure members and as in the FIG. 4 embodiment. The splined sleeve grooves and ridges prevent the flexure members, under the induced direction of bending, from deflecting out of parallelism with the axis alpha.

In all other respects, Applicants' new anti-backlash nut mechanism counteracts backlash by continuously urging the ramps 16, 18 and 20 on the ramps 86 flexure members inwardly to maintain the interior threads 40 in engagement with the threads 42 of the lead screw. When assembled the generally cylindrical force applying sleeve 55 fits over the flexure members with its left-hand (as viewed in the figures) end close to or abutting the face 54 on the cylindrical portion 53 of the face plate 50 or on the face plate itself.

We claim:

1. In an anti-backlash nut designed to move along a threaded, rotatable screw in either of two longitudinal directions, said nut comprising a nut body with one or more longitudinal flexure members having one end fixed to said nut body and one end free floating;
   interior threads on the flexure members in engagement with the threaded screw;
   inclined ramps on the exterior of the free-floating ends of said longitudinal flexure members, said ramps extending radially outwardly in a direction away from the fixed end;
   means, including an annular member surrounding the nut body, for applying an axial force to each of said ramps to continuously urge the threads on the flexure member into engagement with the threaded screw, said axial force being substantially constant in either direction of motion of said nut; normally rotation of the screw acting to induce unwanted flexure of the flexure members tangentially of the longitudinal movement of the nut,
   the improvement comprising means for counteracting the unwanted flexure comprising: mating, longitudinally extending pline means on the longitudinal flexure members and the annular force applying member to impart rigidity to the longitudinal flexure members in a direction tangential to the longitudinal direction of movement of the nut.

2. Anti-backlash nut according to claim 1, wherein the spline means includes a projecting longitudinal ridge on each flexure member and a complementary mating longitudinal groove in the annular force applying member.

3. Anti-backlash nut according to claim 1, wherein the spline means includes a longitudinal groove in each flexure member a complementary mating longitudinal ridge projecting from the annular force applying member.

4. An anti-back nut designed to undergo bidirectional translational movement along a rotatable screw having an external thread thereon in response to relative rotational movement between the anti-backlash nut and screw, said nut having an internal thread complementary to the external thread on said screw and said nut comprising, in combination:
   (a) one or more longitudinal flexure members having one end fixed to said nut and one end free floating, said longitudinal flexure members having inclined ramps on their outer surfaces, said ramps extending radially outwardly in a direction away from the fixed end;
   (b) means including an annular member surrounding the nut body for directly applying an axial force to the ramps on each of said flexure members which axial force is converted by the angle of the ramps to a radial force which urges the flexure members inwardly, whereby the internal threads of said flexure members are maintained in close contact with the external threads of said screw regardless of which direction the nut travels on the thread; normal rotation of the screw acting to induce unwanted flexure of the flexure members tangentially of the translational movement of the nut; and
   (c) means for counteracting the unwanted flexure comprising: mating, longitudinally extending spline means on the longitudinal flexure members and the annular force applying member to impart rigidity to the longitudinal flexure members in a direction tangential to the longitudinal direction of movement of the nut.

5. Anti-backlash nut according to claim 4, wherein the spline means includes a projecting longitudinal ridge on each flexure member and a complementary mating longitudinal groove in the annular force applying member.

6. Anti-backlash nut according to claim 4, wherein the spline means includes a longitudinal groove in each flexure member a complementary mating longitudinal ridge projecting from the annular force applying member.

7. An anti-backlash nut for translation along a rotatable threaded shaft, comprising, in combination:
   (a) one or more longitudinal flexure members having one end fixed to said nut and one end free floating, said longitudinal flexure members having an inclined ramp on their outer surfaces, said ramp extending radially outwardly in a direction away from the fixed end;
   (b) an annular pressure member co-axial to said flexure members for applying an axial force to the ramp on each of said flexure members;

(c) spring means for urging the annular force applying member into engagement with the ramp;
(d) an internal structure comprising threads on said flexure members complementary to and in engagement with the external threaded structure of said shaft;
(e) said ramp having at least one angle of inclination whereby the axial force applied to said ramp urges the internal thread structure of the flexure members into engagement with the external thread structure of said shaft; normal rotation of the screw acting to induce unwanted flexure of the flexure members tangentially of the translational movement of the nut; and
(f) means for counteracting the unwanted flexure comprising: mating, longitudinally extending spline means on the longitudinal flexure member and the annular force applying member to impart rigidity to the longitudinal flexure members in a direction tangential to the direction of translation of the nut along the shaft.

8. Anti-backlash nut according to claim 7, wherein the spline means includes a projecting longitudinal ridge on each flexure member and a complementary mating longitudinal groove in the annular force applying member.

9. Anti-backlash nut according to claim 3, wherein the spline means includes a longitudinal groove in each flexure member a complementary mating longitudinal ridge projecting from the annular force applying member.

* * * * *